Patented Sept. 21, 1926.

1,600,525

UNITED STATES PATENT OFFICE.

ALFRED THAUSS, OF DEUTZ, NEAR COLOGNE, GERMANY, ASSIGNOR, BY MESNE ASSIGNMENTS, TO GRASSELLI DYESTUFF CORPORATION, OF NEW YORK, N. Y., A CORPORATION OF DELAWARE.

THIOPHENOL-SULPHONIC ACID TANNING AND MORDANTING AGENTS.

No Drawing. Application filed December 27, 1923, Serial No. 683,077, and in Germany February 9, 1923.

The United States Letters Patent No. 1,450,463 describes the manufacture and production of new sulphurized compounds of phenol or its homologues or substitution products by the action of sulphur upon phenolic bodies in the presence of caustic alkali. Substantially identical compounds are produced by the action of sulphur chloride upon phenols. In both cases sulphurized compounds containing more than an atom of sulphur per molecule of phenolic body and characterized by their mordanting properties are obtained. These compounds are referred to hereinafter as "highly sulphurized phenols."

It has now been found that new and valuable thio-derivatives can be obtained by treating the above mentioned highly sulphurized phenols with sulphites of alkali metals preferably in the presence of oxidizing agents, such as oxygen, air, hydrogen peroxide or the like.

The new products being probably thio-sulphonic acids are valuable mordants similar to those of the initial materials and have proved to be very valuable tanning agents.

In order to illustrate my invention the following example is given, the parts being by weight:—

76 parts of phenol are dissolved with 30 parts of sodium hydroxide in 80 parts of water. The resulting solution is boiled together with 65 parts of sulphur in a vessel provided with a reflux condenser for 30 hours until a homogeneous viscous mass is obtained which is easily soluble in water giving a clear solution. The melt obtained is then dissolved in 10-15 times its volume of water and 90 parts by weight of neutral sodium sulphite are added. After standing for several days at a temperature of about 70-80° C. and passing air through the mass the product becomes soluble in water. On neutralization of the solution with hydrochloric acid and addition of common salt the product of the reaction separates as an almost white voluminous flocculent mass. It adheres together when warmed and can then be easily filtered off with suction. It is washed with cold water, dried and pulverized. As an alternative procedure the melt is dissolved in water and acidified and the resulting voluminous precipitate is dissolved in 1200 parts of an aqueous solution of 60 parts of sodium carbonate and this solution is treated with sodium sulphite and air and further treated as described above.

Other phenols, such as ortho-, meta- or para-cresol, para- or ortho-chlorophenol, crude cresol, hydroxybenzoic acids etc. can be used. Air can be replaced by other oxidizing agents e. g. $H_2O_2$, oxygen etc.

The products are believed to be compounds of the type represented by the formula·

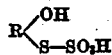

in which R stands for an aryl residue although it is not definitely known whether there is only one or more than one $-S-SO_3H$ group in the molecule. It is understood that the foregoing formula is merely theoretical and that the invention is not limited thereto.

I claim:—

1. In processes of producing thiophenol-sulphonic acid tanning and mordanting agents the step which consists in treating a highly sulphurized phenol with an alkali metal sulphite and an oxidizing agent, substantially as described.

2. In processes of producing a thiophenol-sulphonic acid tanning and mordanting agent the step which consists in treating highly sulphurized phenol with an alkali metal sulphite and oxygen.

3. As a new product, a derivative of a phenol having tanning and mordanting but no dyeing properties, obtainable by treating a highly sulphurized phenol with an alkali metal sulphite in presence of an oxidizing agent.

4. As a new product, a derivative of phenol having tanning and mordanting but no dyeing properties obtainable by treating highly sulphurized phenol with an alkali metal sulphite in presence of an oxidizing agent.

5. A new product having tanning and mordanting properties obtainable by treating a phenolic body with an aqueous caustic alkali solution and sulphur and treating the material so produced with an alkali metal sulphite in presence of an oxidizing agent.

6. A new product having tanning and mordanting properties obtainable by treating phenol with a water solution of caustic alkali and sulphur and treating the material so produced with an alkali metal sulphite and an oxidizing agent substantially as described.

In testimony whereof I have hereunto set my hand.

ALFRED THAUSS.